No. 864,570.

PATENTED AUG. 27, 1907.

P. D. SKAHEN.
PULLEY.
APPLICATION FILED DEC. 12, 1906.

2 SHEETS—SHEET 1.

Witnesses
J. G. Hinkel
J. J. McCarthy

Inventor
by Patrick D. Skahen
Foster Freeman & Watson
Attorneys

No. 864,570. PATENTED AUG. 27, 1907.
P. D. SKAHEN.
PULLEY.
APPLICATION FILED DEC. 12, 1906.
2 SHEETS—SHEET 2.
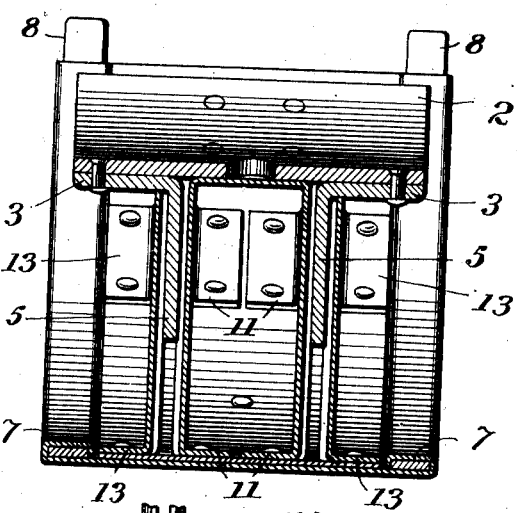
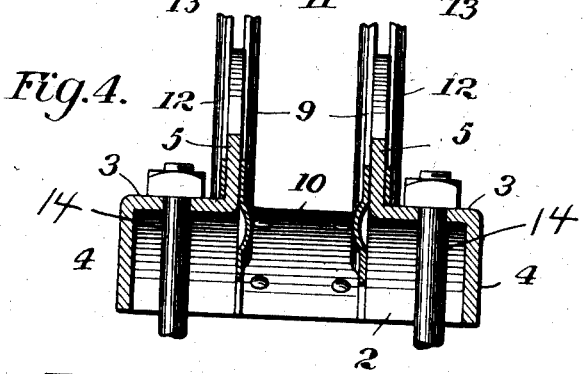
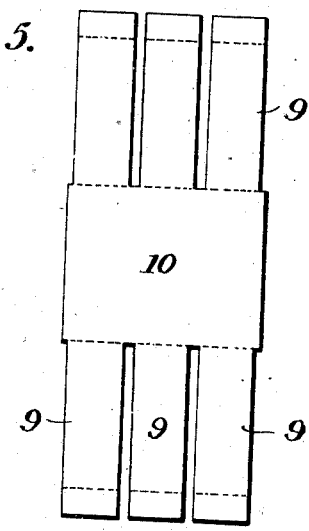
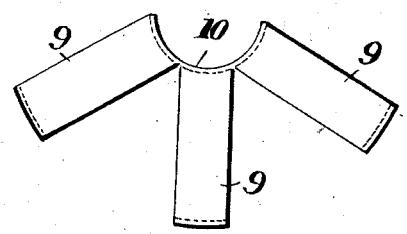
Witnesses
Inventor
Patrick D. Skahen
by Foster Freeman & Watson
Attorneys

UNITED STATES PATENT OFFICE.

PATRICK D. SKAHEN, OF SYRACUSE, NEW YORK.

PULLEY.

No. 864,570.  Specification of Letters Patent.  Patented Aug. 27, 1907.

Application filed December 12, 1906. Serial No. 347,530.

*To all whom it may concern:*

Be it known that I, PATRICK D. SKAHEN, a citizen of the United States, and a resident of Syracuse, Onondaga county, State of New York, have invented certain new and useful Improvements in Pulleys, of which the following is a specification.

This invention relates to metal pulleys and especially to a pulley constructed of sheet metal parts properly stamped or pressed into shape and suitably connected together.

Figure 1:
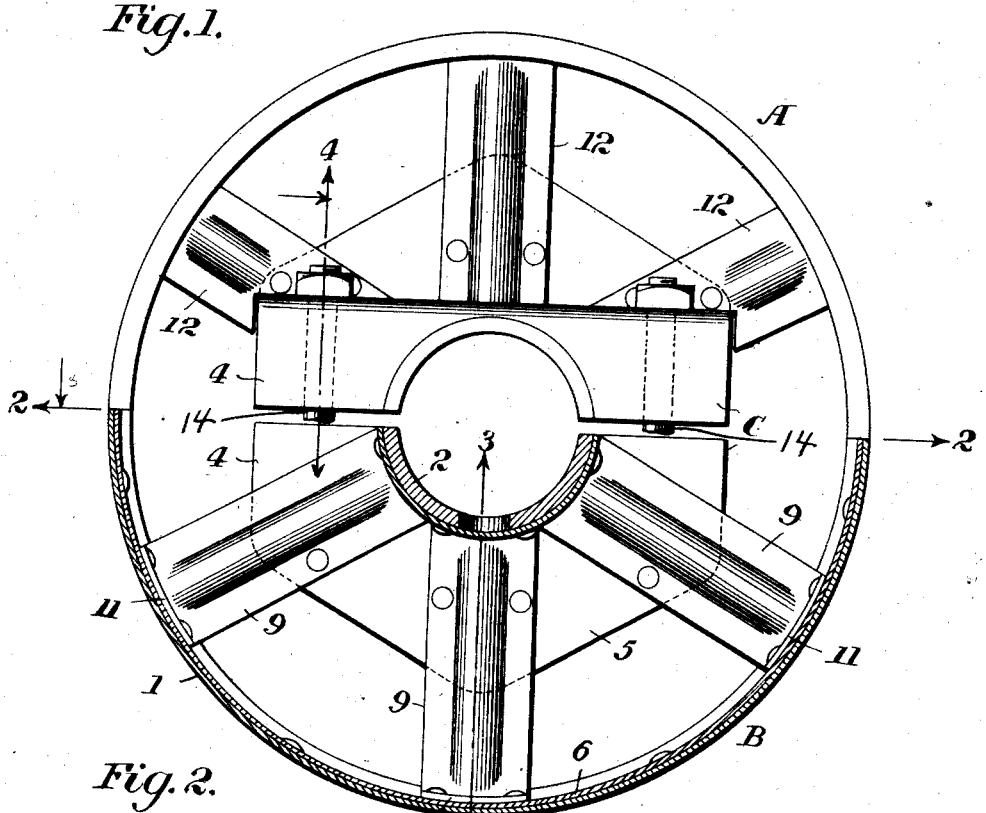
Figure 2:
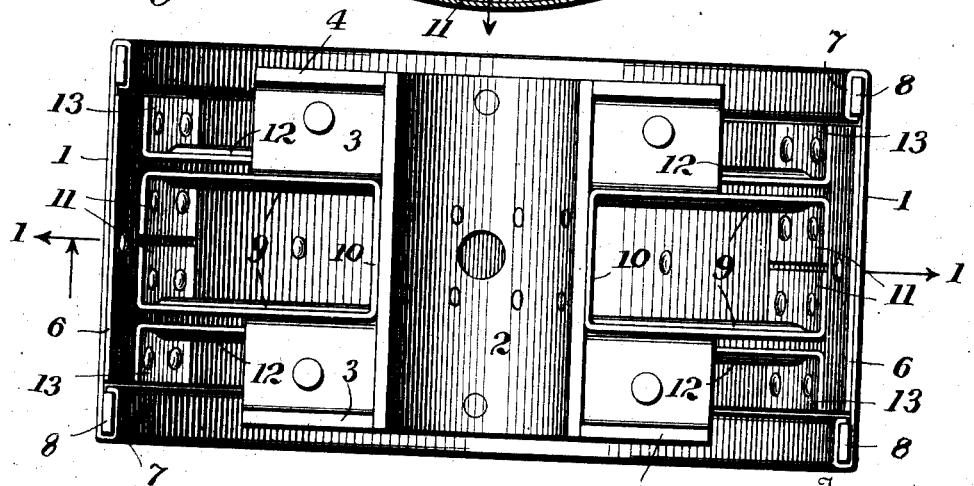

The invention will be described in connection with the accompanying drawing in which, Figure 1 is a side view of a pulley embodying the invention, the lower half of the pulley being shown in section on the line 1—1 of Fig. 2; Fig. 2 is a plan view of one-half of the pulley shown in Fig. 1; Fig. 3 is a section on the line 3—3 of Fig. 1; Fig. 4 is a section on the line 4—4 of Fig. 1; Fig. 5 is a plan view of a blank from which the inner spoke members are formed; Fig. 6 is a side view of spoke members formed from the blank shown in Fig. 5.

Referring to the drawing, A, B, indicate the two halves of a split or divided pulley. These two halves are constructed exactly alike except that the meeting ends of the rim sections are preferably formed to interlock by means of projections upon the one part and recesses in the other, in order that the meeting ends of the rim may register exactly.

Each of the pulley sections comprises a semi-cylindrical rim 1, a semi-cylindrical hub 2, and a plurality of radial spokes connecting the rim with base pieces C which support the hub. Each of the base pieces C consists of a web 3, an outer flange 4 extending toward the radial lines dividing the pulley sections and having a semi-circular recess to receive and support one end of the hub section and an inner flange 5 to which the spokes are connected. Said inner flange being preferably in a plane parallel with the plane of the outer flange and extending toward the rim of the pulley section. The flange 4 is in depth substantially equal to the radius of the hub section and the flange 5 should be deep enough to permit of securely attaching the spokes to it. There are two base pieces to each pulley section, the said pieces being arranged with the flanges 4 at the outside and the flanges 5 at the inside, adjacent to each other.

Instead of connecting the spokes directly to the rim 1, it is preferred to connect them to the semi-circular inner rim sections 6 and to connect the latter to the rim sections 1. The pulley is thus strengthened and stiffened and presents a smooth periphery as the numerous rivets required to connect the spokes with the inner rim 6 are hidden, a very few rivets being sufficient to connect the inner and outer rims. Furthermore, the inner rim can be made narrower than the outer rim and without a bead or flange, which greatly facilitates connecting the spokes with the said inner rim. The outer rim is preferably provided with a bead or rib 7, at each edge, and rods 8 within the beads or ribs are used to interlock the pulley sections, the ends of the rods projecting from one pulley section being adapted to enter the beads or ribs 7 of the other pulley section.

The inner spokes 9 of each pulley section are preferably formed integral, being struck up from a blank similar to that shown in diagram in Fig. 5. These spokes are shown in reduced scale in Fig. 6. They are connected by an intermediate web 10 which is cylindrical and fits the hub section 2, the spokes being suitably connected with the flanges 5 of the base pieces. Each of the spokes 9 is provided with a foot 11 which rests upon the inner rim 6 and is suitably connected thereto. In the smaller sizes of pulleys these spokes 9 are sufficient but in larger sizes additional spokes 12 are used. The spokes 12 are connected at their inner ends with the flanges 5 of the base pieces and at their outer ends they are provided with feet 13 which are connected to the inner rim. The spokes 12 and 9 are placed back to back and are preferably connected together and to the flange 5 by means of rivets passing through all of said parts. The two halves of the pulley are connected by suitable means, as by bolts 14.

It will be evident that the above described pulley is light, strong and durable and can be constructed cheaply.

The invention may be embodied in structures which differ more or less in form and arrangement from that illustrated and described, and it is to be understood that the drawing and description simply disclose one embodiment of the invention, sufficient for a full understanding thereof.

Having described my invention what I claim and desire to secure by Letters Patent is, 1. A sectional sheet metal pulley consisting of two similar halves and means for connecting said halves, each pulley section comprising two base sections having oppositely extending flanges at their sides, a hub section mounted in the flanges at the outer sides of the base sections, a rim section, and spokes connecting the flanges at the inner sides of the base sections with the rim section.

2. A sectional sheet metal pulley consisting of two similar halves and means for connecting said halves, each pulley section comprising two base sections having oppositely extending flanges in parallel planes at their sides, a hub section mounted in the flanges at the outer sides of said base sections, a rim section, and spokes connecting the flanges at the inner sides of said base sections with the rim section.

3. A sectional sheet metal pulley comprising the hub sections, the base pieces having inwardly turned flanges supporting the hub sections and outwardly turned flanges, the radial spokes connected to said outwardly turned flanges, and the rim sections connected to said radial spokes.

4. A sectional sheet metal pulley comprising semi-cylindrical hub sections, base pieces each having a web adjacent to one of the hub sections, a flange supporting the outer end of the hub section and a second flange to which the spokes are connected, spokes connected to said latter flange, and rim sections connected to said spokes.

5. A sectional sheet metal pulley comprising two half-pulley sections, each section comprising a semi-cylindrical hub section, two base pieces having outer flanges supporting the hub section at its ends, and inner flanges to which the spokes are connected, radial spokes connected to said inner flanges, an inner rim section connected to said spokes, and an outer rim surrounding and connected with said inner rim section.

6. A sectional sheet metal pulley comprising hub sections, inner rim sections, each section having spokes formed by a strip having its ends bent laterally and attached to the inner rim section and connected at intermediate points in its length with a hub section, and outer rim sections surrounding and connected with the inner rim sections.

7. In a sectional sheet metal pulley, the combination of hub sections, base pieces supporting the hub sections, spokes connected at their inner ends to the hub sections and at their outer ends to the rim sections and having intermediate connection with the base pieces, and rim sections connected with the outer ends of the spokes.

8. A sectional sheet metal pulley comprising a plurality of sections, each pulley section comprising two base pieces, a hub section, a rim section, and intermediate spokes, each base piece having a flange supporting the outer end of the hub section, a flange connected with the spokes, and an intermediate web at right angles to said flanges.

In testimony whereof I affix my signature in presence of two witnesses.

PATRICK D. SKAHEN.

Witnesses:
J. A. WATSON,
ARTHUR L. BRYANT.